（12） United States Patent
Yoo et al.

(10) Patent No.: US 10,785,491 B2
(45) Date of Patent: Sep. 22, 2020

(54) METHOD OF VISUALIZING IMAGE BASED ON HIERARCHICAL PRESENTATION OF IMAGE TILE INFORMATION, DEVICE AND SYSTEM USING THE METHOD

(71) Applicant: ELECTRONICS AND TELECOMMUNICATIONS RESEARCH INSTITUTE, Daejeon (KR)

(72) Inventors: Jae Jun Yoo, Daejeon (KR); In Sung Jang, Sejong-si (KR); Hyoung Sun Kim, Daejeon (KR); A Hyun Lee, Daejeon (KR); Jung Hee Jo, Daejeon (KR); In Hak Joo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 91 days.

(21) Appl. No.: 16/205,737

(22) Filed: Nov. 30, 2018

(65) Prior Publication Data

US 2019/0261009 A1    Aug. 22, 2019

(30) Foreign Application Priority Data

Feb. 20, 2018    (KR) .................. 10-2018-0020060

(51) Int. Cl.
*H04N 19/30* (2014.01)
*H04N 19/174* (2014.01)
*H04N 19/96* (2014.01)

(52) U.S. Cl.
CPC ........... *H04N 19/30* (2014.11); *H04N 19/174* (2014.11); *H04N 19/96* (2014.11)

(58) Field of Classification Search
CPC ......... H04N 19/30; H04N 19/17; H04N 19/96
See application file for complete search history.

(56) References Cited

U.S. PATENT DOCUMENTS 9,134,135 B2 *  9/2015  Zhao .................. G01C 21/3641
9,241,240 B2 *  1/2016  Djabarov .............. H04W 4/021
(Continued)

FOREIGN PATENT DOCUMENTS

KR        10-1017433 B1      2/2011
KR      10-2015-0059422 A    6/2015
(Continued)

*Primary Examiner* — John J Lee
(74) *Attorney, Agent, or Firm* — LRK Patent Law Firm (57) ABSTRACT

A method of visualizing an image, a device and a system using the same. The method of visualizing, by a device operatively connected with an image provision server, an image configured in a hierarchical structure including a plurality of levels includes receiving tile visualization information in an encoded form from the image provision server, the tile visualization information including a tile visualization type determined according to whether at least one tile belonging to each of the levels of the image includes data; decoding the encoded tile visualization information and obtaining the tile visualization information; making a request to the image providing server for data for a target level and tile, which are to be visualized according to the tile visualization information; and displaying an image, which is to be visualized, received from the image provision server.

20 Claims, 8 Drawing Sheets

(56) References Cited

U.S. PATENT DOCUMENTS

2014/0253577 A1* 9/2014 Jang ................... G09B 29/007
  345/589
2017/0314935 A1* 11/2017 Vakharia ............... G01C 21/32
2017/0345342 A1* 11/2017 Chang ................... G06F 16/986

FOREIGN PATENT DOCUMENTS

| KR | 10-2016-0084147 A | 7/2016 |
| KR | 10-2017-0004292 A | 1/2017 |
| KR | 10-2017-0016168 A | 2/2017 |
| KR | 10-2017-0049946 A | 5/2017 |
| KR | 10-2017-0132988 A | 12/2017 |

* cited by examiner

METHOD OF VISUALIZING IMAGE BASED ON HIERARCHICAL PRESENTATION OF IMAGE TILE INFORMATION, DEVICE AND SYSTEM USING THE METHOD

CROSS REFERENCE TO RELATED APPLICATION

This application claims priority to Korean Patent Application No. 10-2018-0020060, filed on Feb. 20, 2018 in the Korean Intellectual Property Office (KIPO), the entire content of which is hereby incorporated by reference.

BACKGROUND

1. Field of the Invention

Example embodiments of the present invention relate to a method of visualizing an image, a device and a system using the same, and more specifically, to a method of visualizing an image configured in a hierarchical structure including a plurality of levels, a device and a system using the same.

2. Description of Related Art

Recently, Internet maps such as Google Maps, Naver Map, and V-world have been widely recognized and utilized as infrastructure systems that provide maps in association with various services and information linkages. Such Internet maps are configured by building a grid image (image or the like) of a specific size, which is generally called a tile, at various levels and are designed and implemented to transmit an image tile corresponding to a location from a server to a terminal according to a user's request so as to be visualized on the terminal.

In general, the number of the levels for a specific map layer is less than or equal to 20, depending on the design and implementation thereof, and the meaning of each of these levels depends on implementation thereof. For example, the Naver map and the Daum map are configured in levels 1 to 14. For the Naver map, the map presentation becomes more specific as the value of the level increases. For the Naver map, the map presentation becomes more specific as the value of the level decreases. The Google map is configured in levels 0 to 18 or levels 1 to 23. The presentation size of one image tile at each level depends on a predefined size, and the number of levels of a specific map layer and the presentation size of an image tile at a specific level may depend on the type of the map (for example, satellite images, vectors, etc.).

As the number of image tiles constituting a level increases exponentially with the level, the amount of data to be stored in a terminal that implements visualization of a map also increases as to be uncontrollable by the terminal.

As a solution to this issue, a technique for allowing the terminal to receive, from a server, a part to be visualized as necessary has been considered. In this technique, a method to reduce the number of transmission requests for image tiles and a method to reduce unnecessary transmission requests may be significant issues for performance improvement in regard to visualization of a web-based map.

SUMMARY

Accordingly, example embodiments of the present invention are provided to substantially obviate one or more problems due to limitations and disadvantages of the related art.

Example embodiments of the present invention provide an image visualization method of minimizing the number of image tile requests from a terminal to a server by constructing information on the degree of inclusion of data in an image tile, using a quad-tree, and encoding the information using minimum information.

Example embodiments of the present invention also provide an image visualizing device using the image visualization method.

Example embodiments of the present invention also provide an image visualization system including an image visualizing device and an image provision server.

In order to achieve the objective of the present disclosure, a method of visualizing, by a device connected with an image provision server, an image configured in a hierarchical structure including a plurality of levels, may comprise receiving tile visualization information in an encoded form from the image provision server, the tile visualization information including a tile visualization type determined according to whether at least one tile belonging to each of the levels of the image includes data; decoding the encoded tile visualization information and obtaining the tile visualization information; making a request to the image providing server for data for a target level and tile, which are to be visualized according to the tile visualization information; and displaying an image, which is to be visualized, received from the image provision server.

The tile visualization type may comprise "None" which indicates that the tile does not include data to be visualized; "Partial" which indicates that a part of the tile includes data to be visualized; and "Covered" which indicates that an entirety of the tile includes data to be visualized.

The tile visualization information may be presented in the form of a quad-tree, the quad-tree being generated individually for at least one tile belonging to a highest level.

In order to achieve another objective of the present disclosure, a device for visualizing an image configured in a hierarchical structure including a plurality of levels in connection with an image provision server may comprise a processor; and a memory configured to store at least one instruction executed via the processor, wherein the at least one instruction comprises: an instruction to receive tile visualization information in an encoded form from the image provision server, the tile visualization information including a tile visualization type determined according to whether at least one tile belonging to each of the levels of the image includes data; an instruction to decode the encoded tile visualization information and obtain the tile visualization information; an instruction to make a request to the image providing server for data for a target level and tile, which are to be visualized according to the tile visualization information; and an instruction to display an image, which is to be visualized, received from the image provision server.

The quad-tree may be configured to include a node for a tile having the tile visualization type indicated by a "Partial" state or a "Covered" state, and not to include a node for a tile having the tile visualization type indicated by a "None" state. The quad-tree may be configured not to include a child node of a node for a tile having the tile visualization type indicating a "Covered" state.

The tile visualization information may comprise at least one of a number corresponding to the highest level of the quad-tree, a number corresponding to a lowest level of the quad-tree, a size of the highest level, whether a quad-tree is present for each tile of the highest level, the number of nodes belonging to each of the levels of the quad-tree, and values of visualization information on nodes belonging to each of the level of the quad-tree.

The instruction to make the request to the image providing server for the data for the target level and tile, which are to be visualized according to the tile visualization information, may comprise an instruction to identify a path from a root of the quad tree to the tile in the target level; an instruction to check visualization information on the tile in the target level along the path using a structure of the quad-tree included in the tile visualization information; and an instruction to determine the tile that requires a data transmission request according to the checked visualization information.

The image may be a map image and comprise a plurality of different layers depending on how the map image is visualized.

When the plurality of layers include a first layer and a second layer, a first tile of a first level of the second layer located under the first layer may not be visualized when a first tile of a first level of the first layer is in a "Covered" state, and wherein the first tile of the first level of the second layer located under the first layer may be visualized when the first tile of the first level of the first layer is in a "Partial" state.

In order to achieve another objective of the present disclosure, a system for visualizing an image, comprising an image providing server configured to determine, according to a type of inclusion of at least one tile belonging to each level of an image configured in a hierarchical structure including a plurality of levels, a tile visualization type of each tile, to generate tile visualization information in the form of a quad-tree based on the tile visualization type, and to encode and provide the generated tile visualization information; and an image visualizing device configured to receive the encoded tile visualization information from the image provision server, to decode the encoded tile visualization information to obtain the tile visualization information, and to display an image, which is to be visualized, received from the image providing server by making a request to the image providing server for data for a target level and tile, which are to be visualized according to the tile visualization information.

The tile visualization type may comprise "None" which indicates that the tile does not include data to be visualized; "Partial" which indicates that a part of the tile includes data to be visualized; and "Covered" which indicates that an entirety of the tile includes data to be visualized.

BRIEF DESCRIPTION OF DRAWINGS

Example embodiments of the present invention will become more apparent by describing example embodiments of the present invention in detail with reference to the accompanying drawings, in which.

DETAILED DESCRIPTION OF EXAMPLE EMBODIMENTS

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, example embodiments according to the present invention will be described in detail with reference to the accompanying drawings.

Figure 1:
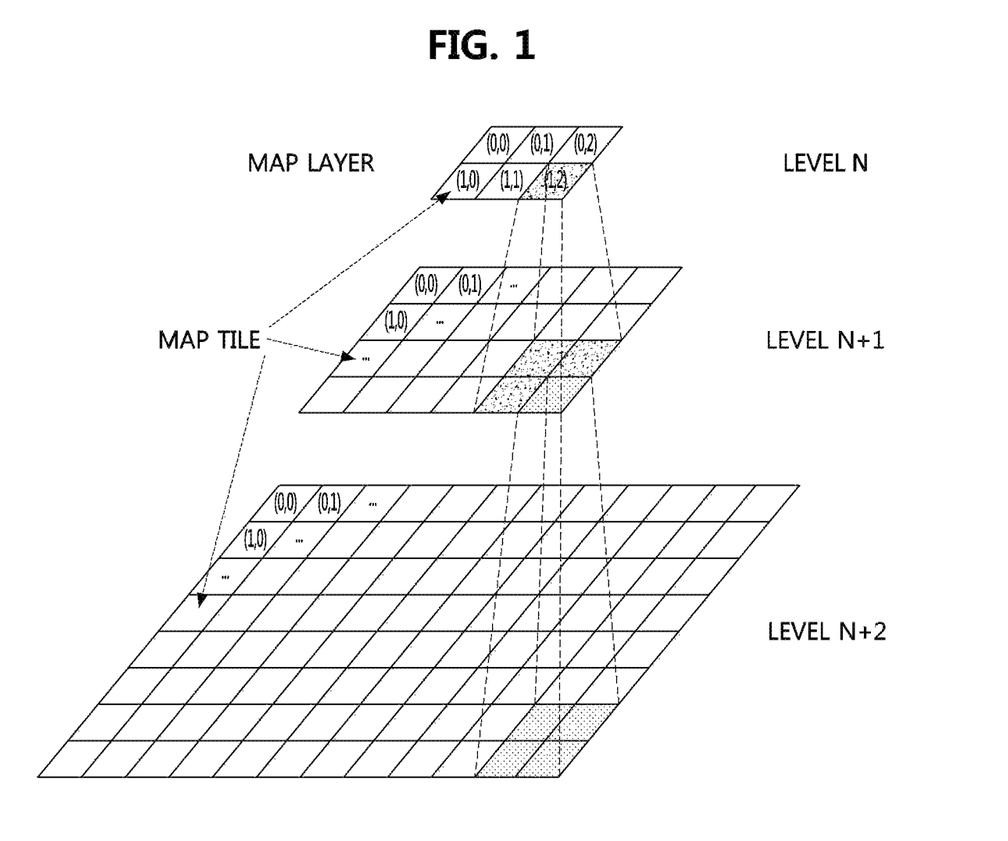
FIG. 1 is a configuration example of a map image having multiple tile-based levels to which the present invention is applied.

FIG. 1 is a configuration example of a map image having multiple tile-based levels to which the present invention is applied.

Referring to FIG. 1, an example, in which one map layer is configured in several levels N, N+1, and N+2 and each of the levels includes a plurality of tiles, is illustrated. In the configuration of a web-based map as shown in FIG. 1, it can be seen that the number of tiles constituting a level increases exponentially as a target area presented in the level is more specific than in other levels. In general, one image tile at a particular level is presented in four tiles at a lower level that more specifically visualizes the map than at the particular level.

The configuration of tiles at each level is related to a method of assigning an identifier (ID) for specifying (identifying) image tiles for each level. For example, in a layer configured in levels 1 to 14, when level 1 is composed of 20 image tiles arranged in 5 columns and 4 rows, level 2 is composed of 80 (=(5*2)*(4*2)) tiles. When this calculation principle is applied to each level, level 14 has 1,342,177,280 (=(5*2^13)*(4*2^13)) tiles.

As the number of tiles constituting a level increases as the level goes down, a device or terminal for visualizing the map may not be able to store all the map tile-related data for each level. Accordingly, the terminal makes a request to the server for map tiles for an image portion to be visualized as needed, receives the map tiles, and visualizes the received map tiles. In this structure, caching or buffering of recently used image tiles in the terminal may be performed to reduce the number of transmission requests for image tiles transmitted from the terminal to the server for performance-related reasons.

There may be various types of maps to be visualized in the terminal. A map to be visualized may be an image captured by a satellite or an aircraft or may be of a vector type. This is because map layers with different meanings can be created depending on the purposes of various applications. Some layers may include data about only some regions rather than including data about the entire world or the entirety of Korea.

Figure 2:
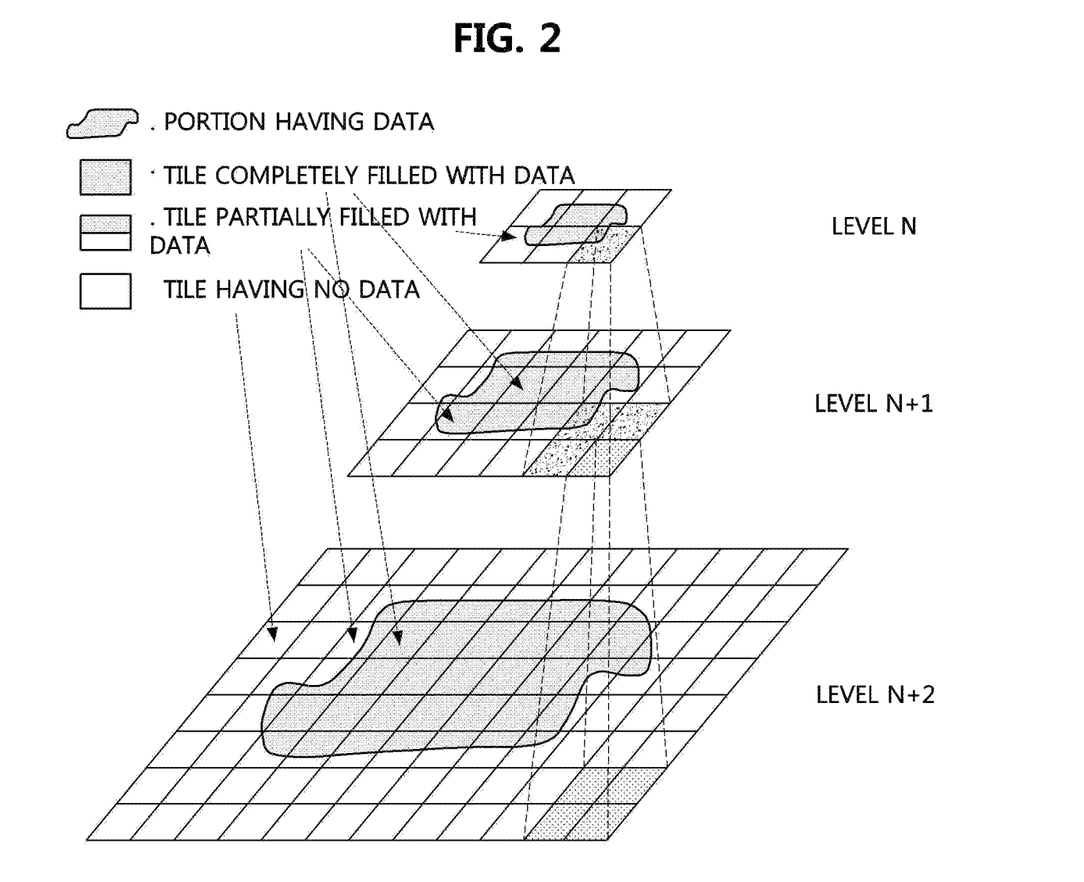
FIG. 2 shows an example of a shape in which data is present in a map image having multiple tile-based levels.

FIG. 2 shows an example of a shape in which data is present in a map image having multiple tile-based levels.

FIG. 2 illustrates an exemplary case where there is data to be visualized for a specific region in the map image having multiple tile-based levels shown in FIG. 1.

Referring to FIG. 2, when tiles in map image are filled with data or information, the tiles may be divided into tiles partially filled with data and tiles having no data.

For tiles that do not actually contain any information, the terminal does not have to make a transmission request to the server for visualization. In addition, in a case where specific levels of multiple layers are visualized in an overlapping manner, when a specific tile of an upper layer is completely filled with data without any empty portion, a request for data in the lower layers does not need to be transmitted from the terminal to the server to receive and visualize corresponding information because the lower layers are not visible to the user even if the lower layers are visualized. However, in the case of a typical system, a transmission request is made for both tiles which do not contain any data and tiles filled with data, and a procedure in which the server confirms that the corresponding requested tile is not actually present is performed. In this way, the transmission request and confirmation procedure for data which is not necessary for visualization of a map image causes degradation of the visualization performance of the web-based map.

In order to address the above-described issue, the present invention hierarchically presents a degree of inclusion of information in the tiles of each level of a web map layer (for example, whether a specific tile is partially or fully filled with data or has no data). Further, the present invention proposes that this information be pre-transmitted from the server to the terminal, and the terminal initially checks this information to reduce the number of requests transmitted from the terminal to the server. One simple solution to this issue is to present a degree of inclusion of data in each tile at each level. For example, in a case where there are 1,342,177,280 tiles in level 14, even when information is presented in 2 bits (0×00: No data, 0×01: Partially filled with data, 0×10: Fully filled with data) per tile, the size of a storage space required to present information in the entire tiles is 1,342,177,280*2 bits=2,684,354,560 bits=335,544,320 bytes=327,680 Kbytes=320 Mbytes. This amount of information is for the highest level of one layer and corresponds to an amount of data excessively large to be pre-transmitted from the server to the terminal for visualization of the map. Therefore, it is difficult to actually use this information as the information can lower system performance. Further, when a plurality of layers are considered, the amount of data is increased by a multiple of the number of layers, which makes it further difficult to use the above-described method.

As a solution to this issue, the present invention aims to create information indicating whether or not data is included in map tiles in visualization of a web map and to reduce the number of tile requests from the terminal to the server using the created information.

Figure 3:
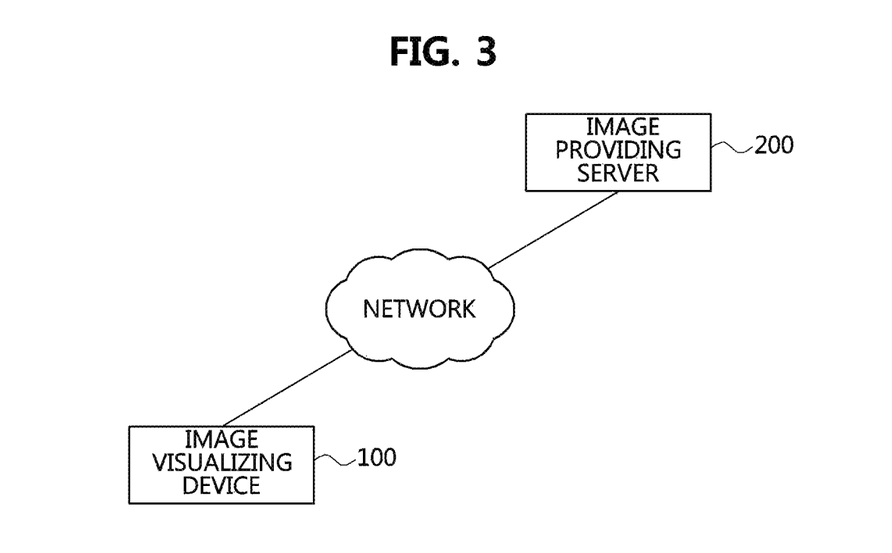
FIG. 3 is a diagram of an image visualization system according to an example embodiment of the present invention.

FIG. 3 is a diagram of an image visualization system according to an example embodiment of the present invention.

An image visualization system according to the example embodiment of the present invention may include an image visualizing device 100 and an image providing server 200 operatively connected with the image visualizing device 100 over a network.

The image providing server 200 according to the example embodiment of the present invention presents information on a degree of inclusion of data in each tile constituting each level of a specific layer in a very compact form, stores the information in a file, and transmits the file to the terminal. The image visualizing device 100 visualizes the map layer by restoring and referring to the transmitted information.

More specifically, the image providing server 200 determines a tile visualization type of each tile belonging to each level of an image configured in a hierarchical structure including a plurality of levels according to a type of inclusion of data in at least one tile, generates tile visualization information in the form of a quad-tree based on the tile visualization type, and encodes and provides the generated tile visualization information.

The image visualizing device receives the encoded tile visualization information from the image provision server, decodes the encoded tile visualization information to obtain the tile visualization information, makes a request to the server for data for a target level and a target tile to be visualized, according to the tile visualization information, and displays a received visualization target image.

The image providing server 200 may be a web server or a network server. Generally, the web server may be connected to multiple unspecified clients or other servers over an open computer network such as the Internet. In this case, the image visualizing device according to one example embodiment of the present invention may be a client operatively connected to the web server. The image providing server 200 includes a computer system configured to receive an operation execution request from a web client or another web server and to derive and provide a result of a corresponding operation, and computer software (a web server program) installed for the computer system.

The image visualizing device according to the present invention may be a personal computer (PC), a laptop computer, a personal digital assistant (PDA), a portable multimedia player (PMP), a PlayStation Portable (PSP), a wireless communication terminal, a smart phone, or a server terminal such as a TV application server and a service server. The image visualizing device may be a user terminal, or various devices including a communication device such as a communication modem configured to perform communication with a wired/wireless communication network, a memory configured to store various programs and data for inter-picture or intra-picture prediction for encoding or decoding images, and a microprocessor configured to execute a program for computation and control.

The image visualizing device 100 and the image providing server 200 according to the example embodiment of the present invention transmit and receive various related information over a network. Here, the network provides communication between the image visualizing device 100 and the image providing server 200 using various communication schemes. For example, the communication schemes may include a wireless communication scheme such as wireless LAN (WLAN), wireless personal area network (WPAN), Wi-Fi, WiBro, WiMAX, High SpeedDownlink Packet Access (HSDPA), or a mobile communication network (4G/5G), or a wired communication scheme such as Ethernet, xDSL (asymmetric digital subscriber line (ADSL) or very high-bit rate digital subscriber line (VDSL)), Hybrid FiberCoaxial Cable (HFC), fiber to the curb (FTTC), or fiber to the home (FTTH).

Figure 4:
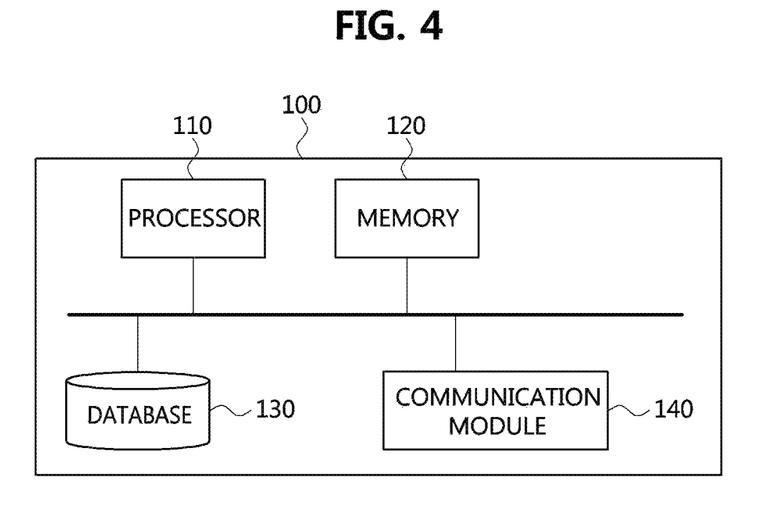
FIG. 4 is a block diagram of an image visualizing device according to an example embodiment of the present invention.

FIG. 4 is a block diagram of an image visualizing device according to an example embodiment of the present invention.

The image visualizing device according to the example embodiment of the present invention may present, in connection with an image provision server, an image configured in a hierarchical structure including a plurality of levels, and include a processor 110 and a memory 120 configured to store at least one instruction to be executed through the processor 110.

Here, the at least one instruction may include: an instruction to cause the processor to receive tile visualization information in an encoded form from the image provision server, the tile visualization information including information on whether data is contained in at least one tile belonging to each level of the image; an instruction to decode the encoded tile visualization information to obtain the tile visualization information; an instruction to make a request to the image providing server for data for a target level and a target tile to be visualized according to the tile visualization information; and an instruction to display a visualization target image received from the image provision server.

The database 130 may store the image visualization information received from the image provision server, data related to image tiles recently used by the processor 110, and the like.

The communication module 140 is a module for communication with the image providing server 200. The communication scheme provided by the communication module of the image visualizing device may include a wireless communication scheme such as WLAN, WPAN, Wi-Fi, WiBro, WiMAX, HSDPA, or a mobile communication network (4G/5G), or a wired communication scheme such as Ethernet, xDSL (ADSL or VDSL), HFC, FTTC, or FTTH.

Figure 5:
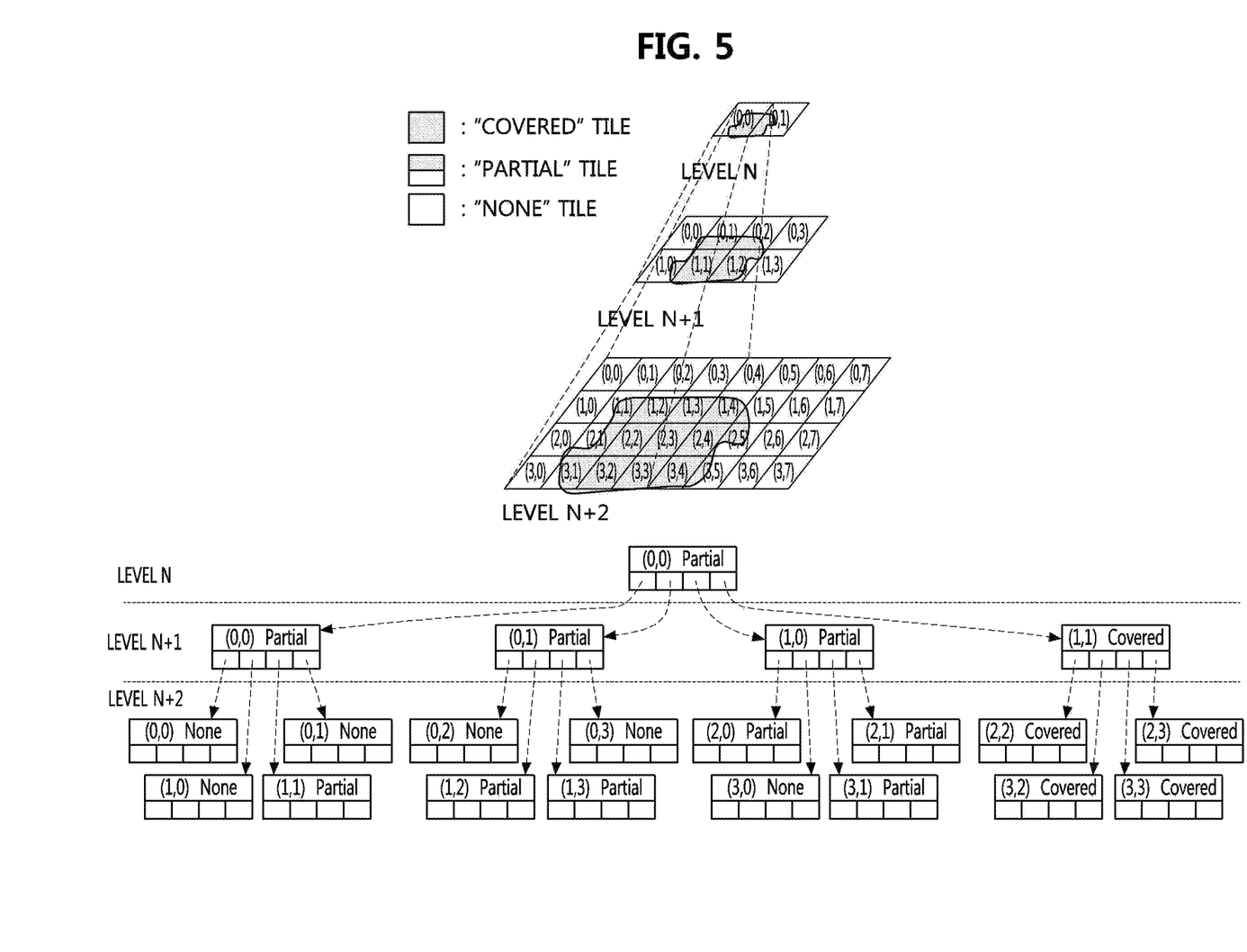
FIG. 5 is a conceptual diagram illustrating a hierarchical structure of an image having a plurality of levels and three types of tile visualization information according to an example embodiment of the present invention.

FIG. 5 is a conceptual diagram illustrating a hierarchical structure of an image having a plurality of levels and three types of tile visualization information according to an example embodiment of the present invention.

In the present invention, the tile visualization information, i.e., information on a degree of inclusion of data in a specific tile, may be presented by the following three types. The three types of the tile visualization information may be presented using at least two-bit data.

None: This indicates a case where the tile does not contain data, namely, the tile does not contain data to be visualized.

Partial: This indicates a case where part of the tile has data, and the tile needs to be visualized. In this case, the tile needs to be visualized. When the tile is present over a specific tile of another layer, the specific tile also needs to be requested and visualized.

Covered: This indicates a case where data is present throughout the entirety of the tile. In this case, the tile needs to be visualized. When the tile is present over a specific tile of another layer, the specific tile does not need to be visualized.

FIG. 5 shows the embodiment in which tile visualization information on each level of a specific layer is hierarchically constructed using a quad-tree. The quad-tree refers to a tree structure in which one node has four child nodes. For example, the quad-tree of FIG. 5 takes a tile corresponding to coordinates (0,0) in level N as a root and structurally presents the visualization information for the tiles of a sub-level for presenting the corresponding region more specifically.

More specifically, in the case of visualization information on tiles belonging to level N+2, for example, the tiles corresponding to positions (0,0) and (0,1) are tiles that contain no information, and therefore the tile visualization information thereon is presented as the "None" state. In addition, the tiles corresponding to positions (2,2) and (2,3) in level N+2 are completely filled with data, and therefore the tile visualization information thereon is presented as the "Covered" state.

A quad-tree according to the embodiment of the present invention is constructed individually for each tile of the highest level and configured to satisfy conditions described below.

The nodes of the quad-tree are constructed only for tiles having tile visualization information indicating the "Partial" or "Covered" state. That is, the tiles having visualization information presented as the "None" state are not included in the quad-tree structure according to the present invention. This is because, when the visualization state of a tile is "None," the visualization information on the tiles of the sub-levels also indicates the "None" state. In addition, since the information to be obtained through the quad-tree according to the present invention is the visualization information on a specific tile at a specific level, the desired information may be obtained by constructing a quad-tree with only the visualization information indicating the "Partial" or "Covered" state. That is, the visualization information on tiles that is not allowed to be queried through the quad-tree constructed according to the present invention may be regarded as the "None" state.

Additionally, when the visualization information on a tile indicates the "Covered" state, the visualization state of all four tiles of the sub-level for the tile are "Covered." Therefore, when a node on the quad-tree is a tile in the "Covered" state, all four child nodes of the tile may also be presumed to be in the "Covered" state. Accordingly, the four child nodes and additional child nodes of the child nodes are not presented as nodes in the quad-tree structure.

Figure 6:
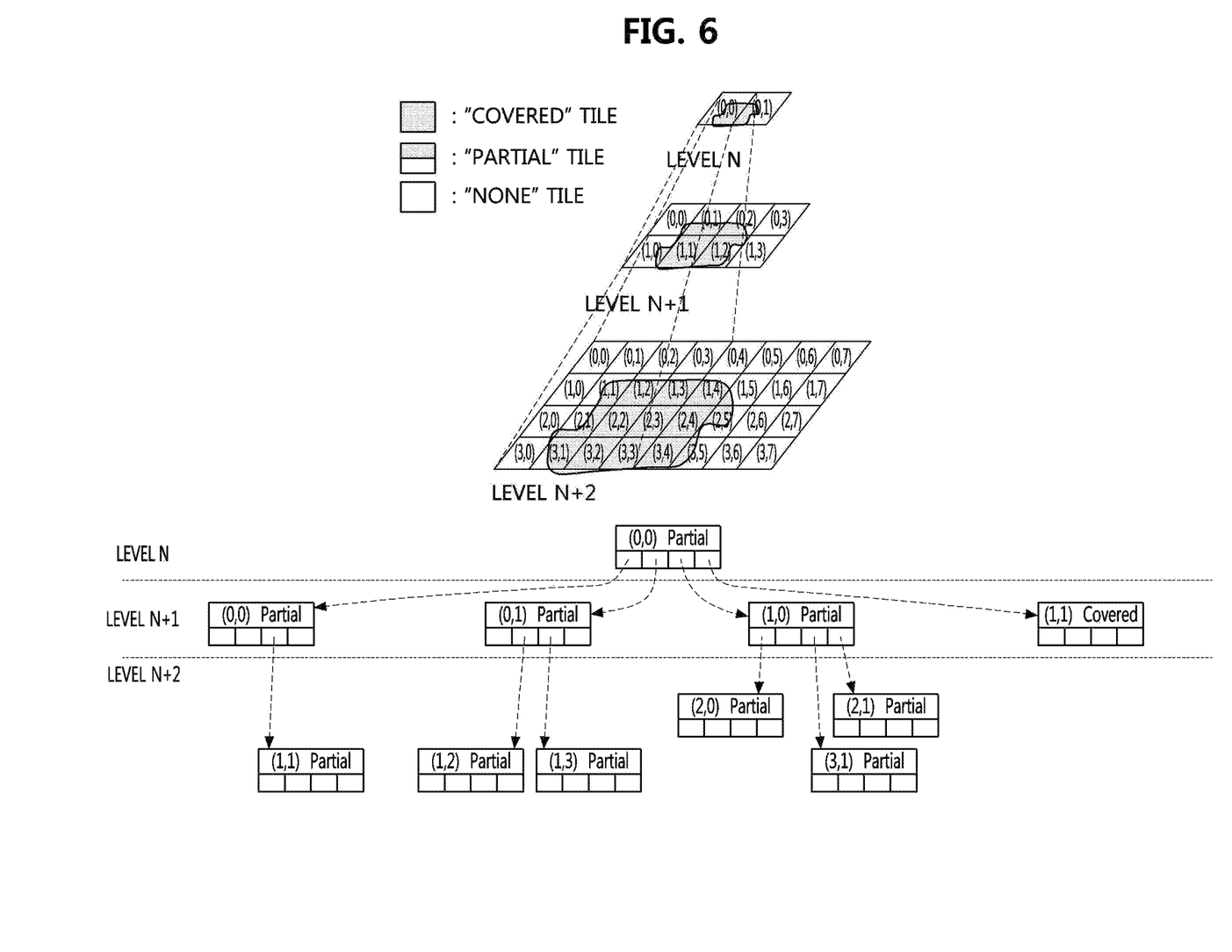
FIG. 6 is a diagram illustrating presentation of a hierarchical structure of an image having a plurality of levels based on a quad-tree according to one embodiment of the present invention.

FIG. 6 is a diagram illustrating presentation of a hierarchical structure of an image having a plurality of levels based on a quad-tree according to one embodiment of the present invention.

FIG. 6 illustrates the embodiment with unnecessary presentations removed from the quad-tree in the hierarchical structure shown in FIG. 5. When the visualization information on the tiles of each level is presented in a quad-tree as in the embodiment of the present invention, the required memory capacity is determined depending on the number of tiles having visualization information that does not indicate the "None" state. In addition, when the visualization information on a specific tile of a higher level is the "Covered" state, the tiles of a lower level are not presented as nodes in the quad-tree. Accordingly, as the number of tiles having visualization information indicating the "None" state or the "Covered" state increases, the quad-tree according to the present invention may present information on more tiles in a simpler structure.

The configuration of the quad-tree according to the present invention discussed above is summarized below.

Nodes belonging to an intermediate level have visualization information indicating the "Partial" state or the "Covered" state. Here, a node in the "Partial" state has one or more child nodes belonging to a lower level, but a node in the "Covered" state does not have any child node belonging to a lower level.

The lowest level does not have any child node. Nodes belonging to the lowest level have visualization information indicating the "Partial" state or the "Covered" state as the nodes of the intermediate level do.

Figure 7:
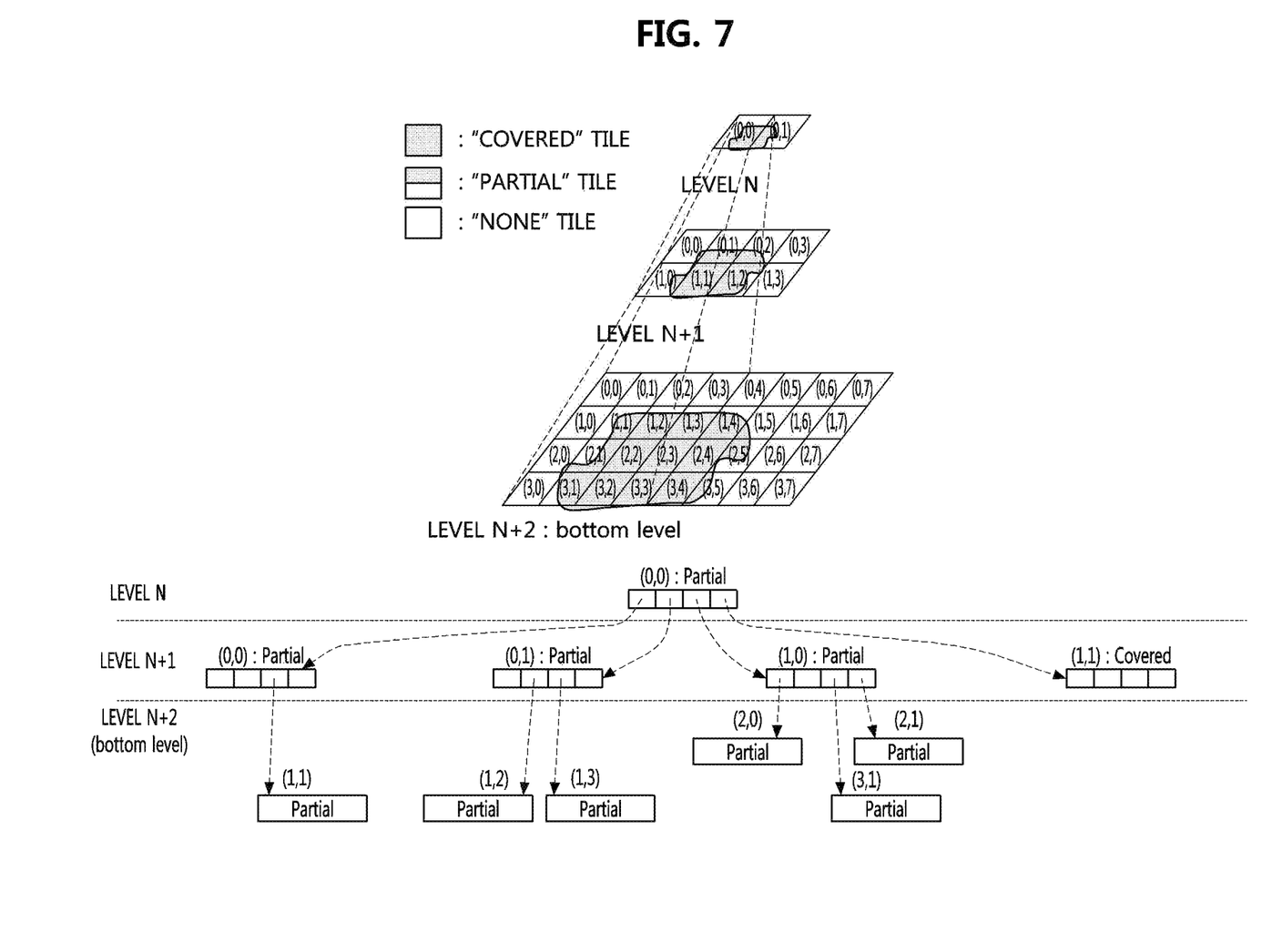
FIG. 7 is a diagram of reconfiguration of presentation of a hierarchical structure of an image having a plurality of levels based on a quad-tree according to one embodiment of the present invention.

Considering the characteristics of the quad-tree according to the present invention as described above, the diagram shown in FIG. 6 may be reconfigured as shown in FIG. 7.

FIG. 7 is a diagram of reconfiguration of presentation of a hierarchical structure of an image having a plurality of levels based on a quad-tree according to one embodiment of the present invention.

As shown in FIG. 7, a server generates visualization information on each tile of each level of a specific layer in a quad-tree structure and encodes the visualization information in the form of a file to be transmitted to a terminal.

The encoded file containing the information about the quad-tree presenting the visualization information on each tile may include information regarding:

a start level (highest level) number and a last level (lowest level) number;

the size of the start level (highest level) and an indication of whether there is a quad-tree for each tile of the start level (highest level);

the number of nodes belonging to each level of the quad-tree; and the values of the visualization information on the nodes belonging to each level of the quad-tree.

Here, regarding the values of the visualization information on the nodes belonging to each level of the quad-tree, the values of the visualization information on the nodes belonging to an intermediate level node which is not the lowest level may be stored using 1 bit per node since only presence or absence of the nodes needs to be indicated. The values of the visualization information on the nodes belonging to the lowest level may be stored using 2 bits per node since not only the presence or absence of the nodes but also the types of visualization of the nodes need to be presented.

When an encoding technique according to one embodiment of the present invention is used, the quad-tree according to the present invention related to the visualization information may be efficiently stored and reconstructed in the form of a file using the minimum information. When the quad-tree-based tile visualization information encoding technique according to the present invention is used, the size of the encoded file may vary according to the number and distribution of tiles having visualization information indicating the "None" state and the "Covered" state.

A device receiving the encoded file may read, on a byte-by-byte basis, the visualization information stored in each level, generate nodes of a lower level according to the value of the visualization information and connect the generated nodes to restore the quad-tree.

The device may find the visualization information on a tile at a specific level and position (coordinates) using the restored quad-tree in a manner in which the device finds a path from the root of the quad-tree to the specific level and coordinates to be found, and then checks the visualization information on each quad-tree node using the quad-tree structure along the path. More specifically, the number of tiles at a level may be four times that of tiles at a higher level, and the positions (coordinates) of the tiles at the level may be defined as follows.

For a tile T indicated by high-level coordinates (x,y), the coordinates of the four tiles contained in the area of the tile T at a lower level are $(x*2, y*2)$, $(x*2+1, y*2)$, $(x*2, y*2+1)$, and $(x*2+1, y*2+1)$.

Therefore, a tile located at coordinates (x, y) at level T is included in a tile at position (coordinates) (x/2, y/2) at level T-1, and is included in a tile located at coordinates (x/2/2, y/2/2) at level T-2, which is a higher level than level T-1. When this process is continuously applied, a path from the root of the quad-tree to a tile at a specific level and position (coordinates) to be checked for the visualization information may be constructed. Once the visualization information on a quad-tree node is checked from the root using the path, the visualization information on the corresponding tile may be found.

Figure 8:
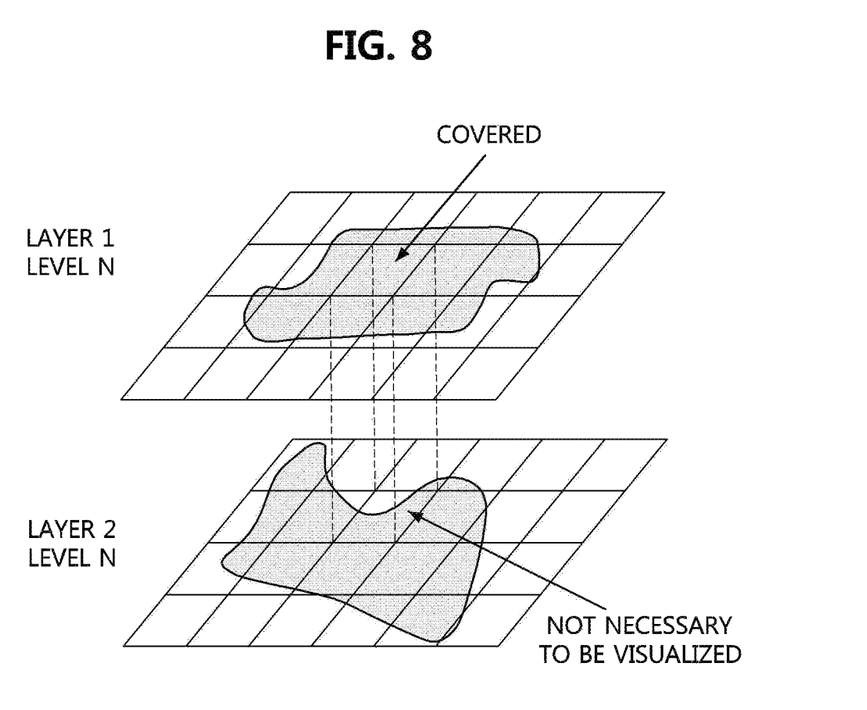
FIG. 8 is a diagram illustrating a case where a plurality of layer images are visualized on a device according to another embodiment of the present invention.

FIG. 8 is a diagram illustrating a case where a plurality of layer images are visualized on a device according to another embodiment of the present invention.

Referring to FIG. 8, in a case where there are images of different layers 1 and 2 for the same region to be presented in a map image, when a specific tile of layer 1 is in the "Covered" state, layer 2 located immediately under layer 1 do not need to be visualized. Accordingly, tiles of layer 2 at the positions of tiles which are in the "Covered" state in layer 1 do not need to be requested to the server by the terminal or visualized.

Here, the layers may include a layer in which an image captured by an aircraft is presented, and a layer presented by vectors.

Figure 9:
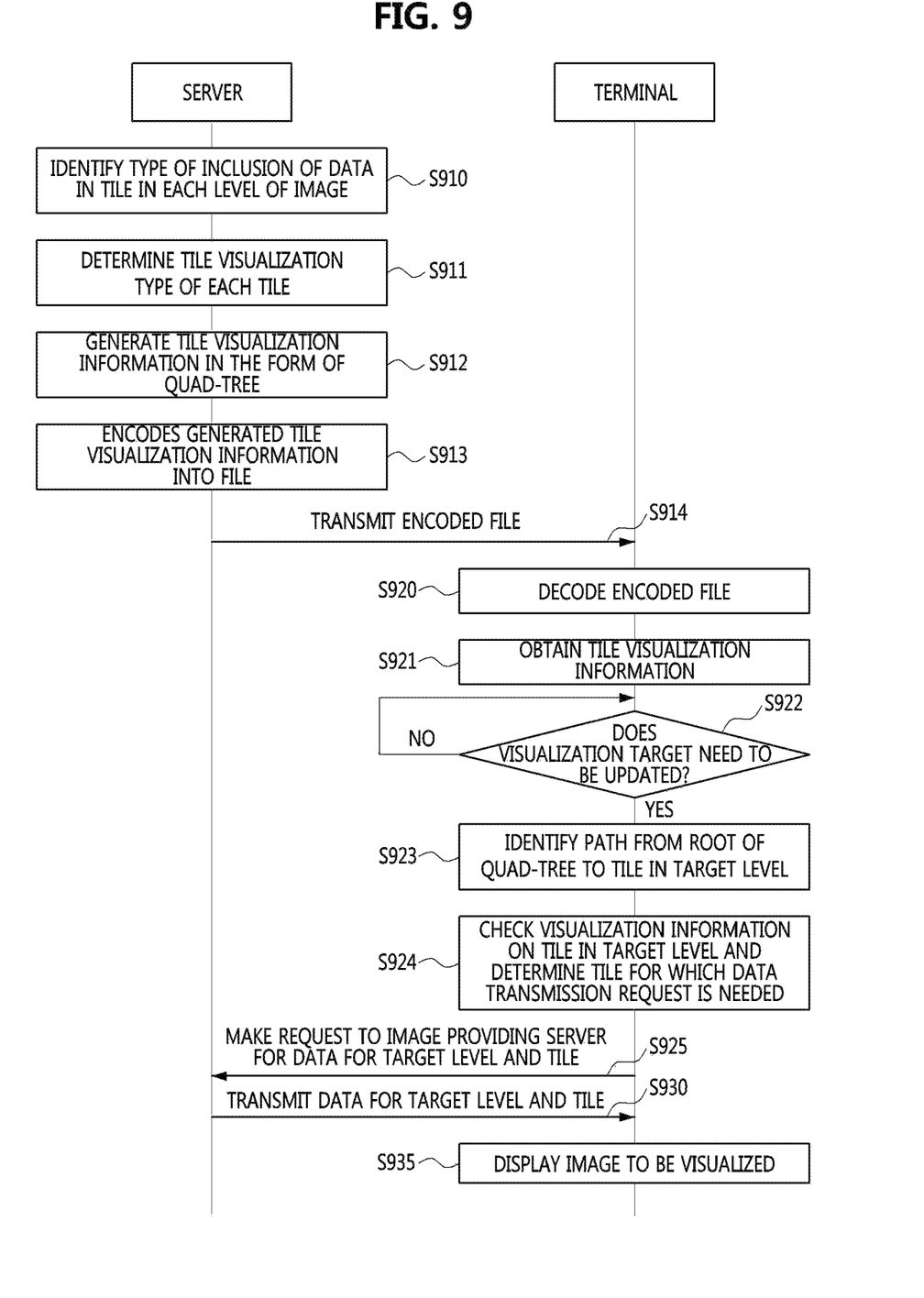
FIG. 9 is a flowchart illustrating an image visualization method implemented by an image providing server and a device according to an embodiment of the present invention.

FIG. 9 is a flowchart illustrating an image visualization method implemented by an image providing server and a device according to an embodiment of the present invention.

Referring to FIG. 9, the image providing server initially determines a tile visualization type of each tile belonging to each level of an image configured in a hierarchical structure including a plurality of levels according to a type of inclusion of data in at least one tile (S910 and S911). Then, the image providing server generates tile visualization information in the form of a quad-tree based on the tile visualization type (S912), and encodes the generated tile visualization information into a file (S913).

The image providing server transmits the encoded file to the device (or terminal) (S914), and the device receiving the encoded file decodes the encoded file (S920) and obtains the tile visualization information (S921).

Thereafter, when it is necessary to update a target image to be visualized in the device according to a request or the like from a device user (YES in S922), the device identifies a path from the root of the quad-tree to a tile in a target level (S923), checks the visualization information on the tile in the target level along the path using the structure of the quad-tree included in the tile visualization information, and determines a tile for which a data transmission request is needed according to the checked visualization information (S924).

Thereafter, the device makes a request to the image providing server for provision of data for a target level and a tile to be visualized according to the tile visualization information (S925). Upon receiving the data for the target level and tile from the image providing server (S930), the device displays the received image to be visualized (S935).

According to the example embodiments of the present invention as described above, visualization information about image tiles in each layer can be presented in a very compact manner, thereby facilitating data transmission from a server to a terminal and improving the visualization performance of the terminal.

Therefore, according to the present invention, networking between the terminal and the server can be reduced.

In addition, according to the present invention, when visualization information is presented in multiple overlapping layers, image tiles which are positioned in a lower layer and do not need to be visualized can be identified and visualization thereof can be omitted, thereby improving the visualization performance of a web-based map.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the example embodiments of the present invention and their advantages have been described in detail, it should be understood that various changes, substitutions and alterations may be made herein without departing from the scope of the invention.

What is claimed is:

1. A method of visualizing, by a device connected with an image provision server, an image configured in a hierarchical structure including a plurality of levels, the method comprising:
    receiving tile visualization information in an encoded form from the image provision server, the tile visualization information including a tile visualization type determined according to whether at least one tile belonging to each of the levels of the image includes data;
    decoding the encoded tile visualization information and obtaining the tile visualization information;
    making a request to the image providing server for the data for a target level and the tile, which are to be visualized according to the tile visualization information; and
    displaying the image, which is to be visualized, received from the image provision server.

2. The method of claim 1, wherein the tile visualization type comprises:
    "None" which indicates that the tile does not include data to be visualized;
    "Partial" which indicates that a part of the tile includes data to be visualized; and
    "Covered" which indicates that an entirety of the tile includes data to be visualized.

3. The method of claim 1, wherein the tile visualization information is presented in the form of a quad-tree, the quad-tree being generated individually for at least one tile belonging to a highest level.

4. The method of claim 3, wherein the quad-tree is configured to include a node for a tile having the tile visualization type indicated by a "Partial" state or a "Covered" state, and
    not to include a node for a tile having the tile visualization type indicated by a "None" state.

5. The method of claim 3, wherein the quad-tree is configured not to include a child node of a node for a tile having the tile visualization type indicating a "Covered" state.

6. The method of claim 3, wherein the tile visualization information comprises at least one of a number corresponding to the highest level of the quad-tree, a number corresponding to a lowest level of the quad-tree, a size of the highest level, whether a quad-tree is present for each tile of the highest level, the number of nodes belonging to each of the levels of the quad-tree, and values of visualization information on nodes belonging to each of the level of the quad-tree.

7. The method of claim 3, wherein the making of the request to the image providing server for the data for the target level and tile, which are to be visualized according to the tile visualization information, comprises:
identifying a path from a root of the quad tree to the tile in the target level;
checking visualization information on the tile in the target level along the path using a structure of the quad-tree included in the tile visualization information; and
determining at least one tile that requires a data transmission request according to the checked visualization information.

8. The method of claim 1, wherein the image is a map image and comprises a plurality of different layers depending on how the map image is visualized.

9. The method of claim 8, wherein, when the plurality of layers include a first layer and a second layer,
a first tile of a first level of the second layer located under the first layer is not visualized when a first tile of a first level of the first layer is in a "Covered" state, and
wherein the first tile of the first level of the second layer located under the first layer is visualized when the first tile of the first level of the first layer is in a "Partial" state.

10. A device for visualizing an image configured in a hierarchical structure including a plurality of levels in connection with an image provision server, the device comprising:
a processor; and
a memory configured to store at least one instruction executed via the processor,
wherein the at least one instruction comprises:
an instruction to receive tile visualization information in an encoded form from the image provision server, the tile visualization information including a tile visualization type determined according to whether at least one tile belonging to each of the levels of the image includes data;
an instruction to decode the encoded tile visualization information and obtain the tile visualization information;
an instruction to make a request to the image providing server for the data for a target level and the tile, which are to be visualized according to the tile visualization information; and
an instruction to display the image, which is to be visualized, received from the image provision server.

11. The device of claim 10, wherein the tile visualization type comprises:
"None" which indicates that the tile does not include data to be visualized;
"Partial" which indicates that a part of the tile includes data to be visualized; and
"Covered" which indicates that an entirety of the tile includes data to be visualized.

12. The device of claim 10, wherein the tile visualization information is presented in the form of a quad-tree, the quad-tree being generated individually for at least one tile belonging to a highest level.

13. The device of claim 12, wherein the quad-tree is configured to include a node for a tile having the tile visualization type indicated by a "Partial" state or a "Covered" state, and not to include a node for a tile having the tile visualization type indicated by a "None" state.

14. The device of claim 12, wherein the quad-tree is configured not to include a child node of a node for a tile having the tile visualization type indicating a "Covered" state.

15. The device of claim 12, wherein the tile visualization information comprises at least one of a number corresponding to the highest level of the quad-tree, a number corresponding to a lowest level of the quad-tree, a size of the highest level, whether a quad-tree is present for each tile of the highest level, the number of nodes belonging to each of the levels of the quad-tree, and values of visualization information on nodes belonging to each of the level of the quad-tree.

16. The device of claim 12, wherein the instruction to make the request to the image providing server for the data for the target level and tile, which are to be visualized according to the tile visualization information, comprises:
an instruction to identify a path from a root of the quad tree to the tile in the target level;
an instruction to check visualization information on the tile in the target level along the path using a structure of the quad-tree included in the tile visualization information; and
an instruction to determine the tile that requires a data transmission request according to the checked visualization information.

17. The device of claim 10, wherein the image is a map image and comprises a plurality of different layers depending on how the map image is visualized.

18. The device of claim 17, wherein, when the plurality of layers include a first layer and a second layer,
a first tile of a first level of the second layer located under the first layer is not visualized when a first tile of a first level of the first layer is in a "Covered" state, and
the first tile of the first level of the second layer located under the first layer is visualized when the first tile of the first level of the first layer is in a "Partial" state.

19. A system for visualizing an image, comprising:
an image providing server configured to determine, according to a type of inclusion of at least one tile belonging to each level of the image configured in a hierarchical structure including a plurality of levels, a tile visualization type of each tile, to generate tile visualization information in a form of a quad-tree based on the tile visualization type, and to encode and provide the generated tile visualization information; and
an image visualizing device configured to receive the encoded tile visualization information from the image provision server, to decode the encoded tile visualization information to obtain the tile visualization information, and to display the image, which is to be visualized, received from the image providing server by making a request to the image providing server for data for a target level and tile, which are to be visualized according to the tile visualization information.

20. The system of claim 19, wherein the tile visualization type comprises:
"None" which indicates that the tile does not include data to be visualized;
"Partial" which indicates that a part of the tile includes data to be visualized; and
"Covered" which indicates that an entirety of the tile includes data to be visualized.

* * * * *